(12) United States Patent
Bakir et al.

(10) Patent No.: US 12,257,761 B2
(45) Date of Patent: Mar. 25, 2025

(54) THERMOFORMING SYSTEM

(71) Applicant: TUSAS-TURK HAVACILIK VE UZAY SANAYII ANONIM SIRKETI, Ankara (TR)

(72) Inventors: Mete Bakir, Ankara (TR); Yakup Bay, Ankara (TR); Fahrettin Ozturk, Ankara (TR)

(73) Assignee: TUSAS-TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 108 days.

(21) Appl. No.: 18/023,489

(22) PCT Filed: Apr. 26, 2021

(86) PCT No.: PCT/TR2021/050386
§ 371 (c)(1),
(2) Date: Feb. 27, 2023

(87) PCT Pub. No.: WO2022/046002
PCT Pub. Date: Mar. 3, 2022

(65) Prior Publication Data
US 2023/0311403 A1    Oct. 5, 2023

(51) Int. Cl.
*B29C 51/18*    (2006.01)
*B29C 51/26*    (2006.01)
(Continued)

(52) U.S. Cl.
CPC ............ *B29C 51/18* (2013.01); *B29C 51/261* (2013.01); *B29C 51/421* (2013.01); *B29C 51/46* (2013.01)

(58) Field of Classification Search
CPC ..... B29C 51/18; B29C 51/261; B29C 51/428; B29C 51/262; Y10S 425/048
See application file for complete search history.

(56) References Cited

U.S. PATENT DOCUMENTS 3,827,683 A * 8/1974 Seborg ................ B29C 51/262
                                                    269/9
4,289,469 A    9/1981 Keim
(Continued)

FOREIGN PATENT DOCUMENTS

| CN | 110696334 A | 1/2020 |
| JP | H10100156 A | 4/1998 |
| WO | 09633060 A1 | 10/1996 |

OTHER PUBLICATIONS

International Search Report and Written Opinion for PCT application No. PCT/TR2021/050386, mailed Oct. 7, 2021.
(Continued)

*Primary Examiner* — Jerzi H Moreno Hernandez
(74) *Attorney, Agent, or Firm* — NOTARO, MICHALOS & ZACCARIA P.C.

(57) ABSTRACT

A thermoforming system has a composite plate, a loading area in which the plate is placed, a heating area in which the plate is heated, a pressing area in which the plate is formed, and at least one mold which is located in the pressing area that applies heat and pressure to the plate so that the plate is formed. The system also includes a thermoforming area which is formed by the loading area, heating area, and the pressing area and consists of at least two different surfaces located opposite each other. A rail system is located on at least one surface in the thermoforming area and allows the plate to be conveyed within the thermoforming area.

12 Claims, 8 Drawing Sheets

(51) Int. Cl.
    *B29C 51/42*      (2006.01)
    *B29C 51/46*      (2006.01)

(56) References Cited

U.S. PATENT DOCUMENTS

| | | | |
|---|---|---|---|
| 5,863,568 A | 1/1999 | Tomita | |
| 7,210,606 B2 | 5/2007 | Irwin | |
| 7,481,640 B1 | 1/2009 | Jordan | |
| 8,309,009 B2 * | 11/2012 | Fingerhut | B29C 51/261 |
| | | | 425/352 |
| 2020/0207496 A1 | 7/2020 | Schwab | |
| 2023/0302746 A1 * | 9/2023 | Bakir | B29C 51/262 |

OTHER PUBLICATIONS

International Preliminary Report on Patentability, completed Sep. 6, 2022.
Demand/Request for Preliminary Examination dated Jun. 27, 2022.
International Application Status Report generated Feb. 20, 2023.

* cited by examiner

THERMOFORMING SYSTEM

The present invention relates to thermoforming and consolidation systems used in forming process of thermoplastic materials.

Thermoforming is a widely used manufacturing process where a plastic sheet or plate is heated at a forming temperature, giving a certain form to the plastic part under pressure in one or more molds. In addition, thermoplastic-based composites differ from conventional thermoset-based composites in that they are able to change shape under the effect of heat thanks to their chemical properties. Therefore, thermoplastic-based composites can be provided with a desired form under the effect of temperature and pressure in a mold by using the thermoforming method, usually with a hydraulic press, without requiring long-term thermal curing in autoclave.

In the patent application U.S. Pat. No. 7,210,606B2, which is included in the known-state of the art, manufacture of plastic products using a pressure difference thermoforming device is disclosed. Said patent document discloses a web support device and method for limiting sagging of a plastic web from thermoformable material while processing the material through a heating station and into a thermoforming station. For the thermoforming device, there are disclosed a web conveyor, a frame, a pair of conveyor rails carried by the frame in laterally spaced-apart relation and configured to support and convey respective edges of a thermoformable web of plastic material.

In the patent application JPH10100156A, which is included in the known-state of the art, there is disclosed a molding method for the production of goods from thermoplastic material. In said method, temperature of the mold is increased above a thermal deformation temperature of the resin by means of a mold temperature control system, and then the mold is cooled to a low temperature. Water and oil can be used for the aforementioned heating and cooling processes, wherein the hot oil and cold oil are transferred to the mold by separate lines without mixing.

In the patent document CN110696334A, which is included in the known-state of the art, a forming machine is explained. Said machine comprises a conveying system for conveying plastic plates to a mold for the thermoforming process. The conveying system comprises a rail base to provide movement in the horizontal axis and the vertical axis, a horizontal driving mechanism which moves the rail base on the horizontal axis, and a driving mechanism which moves the rail base on the vertical axis.

In the patent document WO09633060A1, which is included in the known-state of the art, a forming method for obtaining products from thermoplastic materials is disclosed. In said method, the materials are placed in the mold in the form of layers and a consolidation step is applied to the material layers. In high temperature applications carried out in this process, hot oil is transmitted into the mold, and with this hot oil, the mold can reach the desired high temperature value.

In the patent document US2020/207496A1, this is included in the known-state of the art, an installation for producing containers by thermoforming, comprising conveying means able to be controlled by a control unit for driving a thermoplastic substrate in a series of processing stations along a conveying direction. The present disclosure aims at improving this state of the art by overcoming at least substantially the aforementioned drawbacks.

In the patent document U.S. Pat. No. 4,289,469A, this is included in the known-state of the art, an apparatus for forming and trimming articles from a web. The apparatus comprises two conveyors, the first conveyor moving the web through the forming press and into a trimming station, the second conveyor moving the web within the trimming station. The two conveyors move in unison to transport a newly-formed section of web into the trimming station; a shear located between the conveyors severs the web; and, without loss of registration, the second conveyor moves the severed section of web past a trimming die, which cuts articles from a fraction of the severed section during each cycle.

In the patent document U.S. Pat. No. 7,481,640B1, this is included in the known-state of the art, a scrapless thermoforming machine and associated method for scrapless thermoforming of input plastic materials into containers. The scrapless thermoforming machine comprises a plurality of transport trays having frames configured to hold a plurality of thermoplastic billets and billet clamps; an oven configured to heat the billets; a form press configured to form the billets into containers; a loading and unloading station, the loading and unloading station having a billet loading side and a container unloading side.

In the patent document U.S. Pat. No. 5,863,568A, this is included in the known-state of the art, an apparatus for thermoforming thermoplastic sheets, and more particularly, to an apparatus of this kind incorporating an improved frame for supporting a thermoplastic sheet to be formed. The said forming means having a pair of molding dies for gripping the sheet in a direction Thanks to the thermoforming system developed with this invention, an efficient, effective and reliable thermoforming system and production method are obtained for high performance thermoplastic-based composites used as primary and secondary structural elements in the aviation industry.

Another object of the present invention is to provide a thermoforming system suitable for mass production for polymer types in the PEAK family such as polyetherketone (PEEK), polyetherketonketone (PEKK) and thermoplastic composites containing ceramic, carbon, and aramid.

Another object of the present invention is to provide an effective system that allows the workpiece to be conveyed and formed in a reliable manner in thermoforming systems.

A further object of the invention is to provide a cost-effective and effective heating and cooling system for male and female molds used in thermoforming systems.

Yet another object of the invention is to provide an effective thermoplastic fabric joining method, a heating and cooling device and a mold for consolidation processes performed before the thermoform manufacturing method.

The thermoforming system realized to achieve the object of the invention and defined in the first claim and the claims dependent thereon comprises a plate; a loading area (Y) where the plate is loaded; a heating area (I) in which the plate is preheated such that its melting temperature is exceeded; a pressing area (B) in which the plate is formed in at least one mold under temperature and pressure; a thermoforming area (S) formed by the loading area (Y), the heating area (I) and the pressing area (B); a rail system located in the thermoforming area (S) and allowing the plate to be conveyed between the loading area (B), the heating area (I) and the pressing area (B).

The thermoforming system of the invention comprises a holding apparatus located on the rail system such that it can slide on the rail system; at least one frame on which the workpiece plate can be placed, wherein the frame can be mounted removably on the holding apparatus; a control unit which allows the frame to be detached from the holding apparatus and/or the frame to be attached to the holding apparatus.

In an embodiment of the invention, the thermoforming system comprises at least one magnet on the holding apparatus and/or the frame, which allows the frame to be held by the holding apparatus by means of the control unit.

In an embodiment of the invention, the thermoforming system comprises an electronic component located on the holding apparatus, capable of moving together with the holding apparatus and allowing the electrical communication between the control unit and the magnet to take place, thus allowing the holding apparatus to release and hold the frame.

In an embodiment of the invention, the thermoforming system comprises a frame which can be folded and/or bent by means of a magnet.

In an embodiment of the invention, the thermoforming system comprises a support element which effectively protects the system from imbalance caused by the sliding movement of the holding apparatus on the rail system and resulting from the loss of weight balance, wherein the support element moves on the rail system with the movement of the holding apparatus; and an electromechanical control unit which allows movement of the support element on the rail.

In an embodiment of the invention, the thermoforming system comprises at least two channels located in the mold, which allow the temperature of the mold to be adjusted and allow the thermal oil to flow therethrough without mixing with each other.

In an embodiment of the invention, the thermoforming system comprises a mold heater which is located on the mold and allows the temperature of the mold to be adjusted, the mold to be heated and/or cooled.

In an embodiment of the invention, the thermoforming system comprises a cold tank containing thermal oil; a heat exchanger in connection with the cold tank and allowing the cold tank to be cooled; a cooler connected to the cold tank by a line and allowing the thermal oil in the cold tank to be cooled and/or heated; a hot tank containing thermal oil inside; a heater which is connected to the hot tank and allows the thermal oil in the hot tank to be heated; at least one circulation pump which allows the thermal oils in the hot tank and cold tank to be transferred to the channels in the mold, and allows the thermal oils to be driven through the channels again; a conditioning unit consisting of the cold tank, hot tank, heater, cooler, circulation pump and heat exchanger.

In an embodiment of the invention, the thermoforming system comprises a resin-impregnated (prepreg) composite fiber; at least one consolidation mold on which the fiber is laid and which allows the fiber to be consolidated and joined under the temperature and pressure determined by the user; at least two independent consolidation mold channels located in the consolidation mold, which allow the temperature of the consolidation mold to be adjusted and allow the thermal oil flow therethrough.

In an embodiment of the invention, the thermoforming system comprises a conditioning unit which allows the heating, cooling and circulation of the thermal oil flowing through the consolidation mold channels, and allows the circulation of thermal oils between the conditioning unit and the consolidation mold.

In an embodiment of the invention, the thermoforming system comprises a warm tank containing thermal oil inside and located in the conditioning unit, wherein the warm tank allows thermal oil transfer to the consolidation mold channels located in the consolidation mold by means of a circulation pump, thus allowing the mold to be heated and/or cooled more tolerantly; a reheater located in the conditioning unit and allowing the warm tank to be heated.

In an embodiment of the invention, the thermoforming system comprises a consolidation mold heater such as an electrical resistance located on the consolidation mold, which enables the consolidation mold to be heated and/or cooled.

In an embodiment of the invention, the thermoforming system comprises a movable carrying vehicle which allows the plate and the frame to be carried to the loading area (Y), wherein the movable carrying vehicle is removably attached to the loading area (Y), wherein the frame can be mounted removably on the carrying vehicle.

In an embodiment of the invention, the thermoforming system comprises a thermal door located in the thermoforming area (S) and removably attached, which partially prevents the heat transfer between the loading area (Y) and the heating area (I).

In an embodiment of the invention, the thermoforming system comprises a plate; a loading area (Y) to which the plate is brought and loaded; a heating area (I) in which the plate is preheated and its melting temperature is exceeded; a pressing area (B) in which the plate is formed in at least one mold under temperature and pressure; a thermoforming area (S) formed by the loading area (Y), the heating area (I) and the pressing area (B); a rail system located in the thermoforming area (S).

The thermoforming system of the invention comprises a control unit for:
  receiving the frame and plate by the holding apparatus by means of the magnet controlled by the control unit in the loading area (Y) and, starting to convey them;
  moving the plate to the heating area (I) by the holding apparatus sliding on the rail system;
  as a result of the sliding movement performed by the holding apparatus, providing the balance on the rail system by the support element by moving;
  heating the plate conveyed into the heating area (I);
  conveying the frame, thus the plate, into the pressing area (B) by means of the holding apparatus;
  as a result of the sliding movement performed by the holding apparatus, providing the balance on the rail system by the support element by moving;
  positioning the plate and frame in an efficient and reliable manner before bending the frame by means of the magnet, thus before the plate is formed in the mold;
  forming the plate placed in the mold through the control unit by subjecting it to a thermoforming process.

The thermoforming system realized to achieve the object of the present invention is illustrated in the attached drawings, in which.

Figure 1:
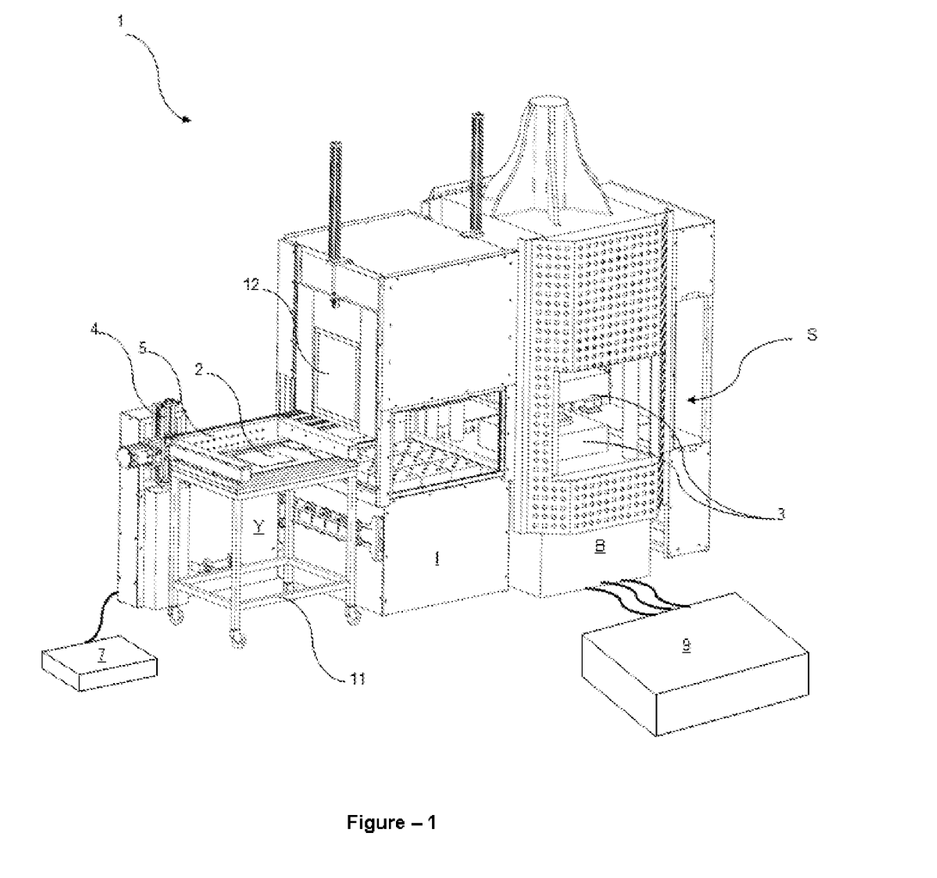
FIG. 1 is a perspective view of the thermoforming system.
Figure 2:
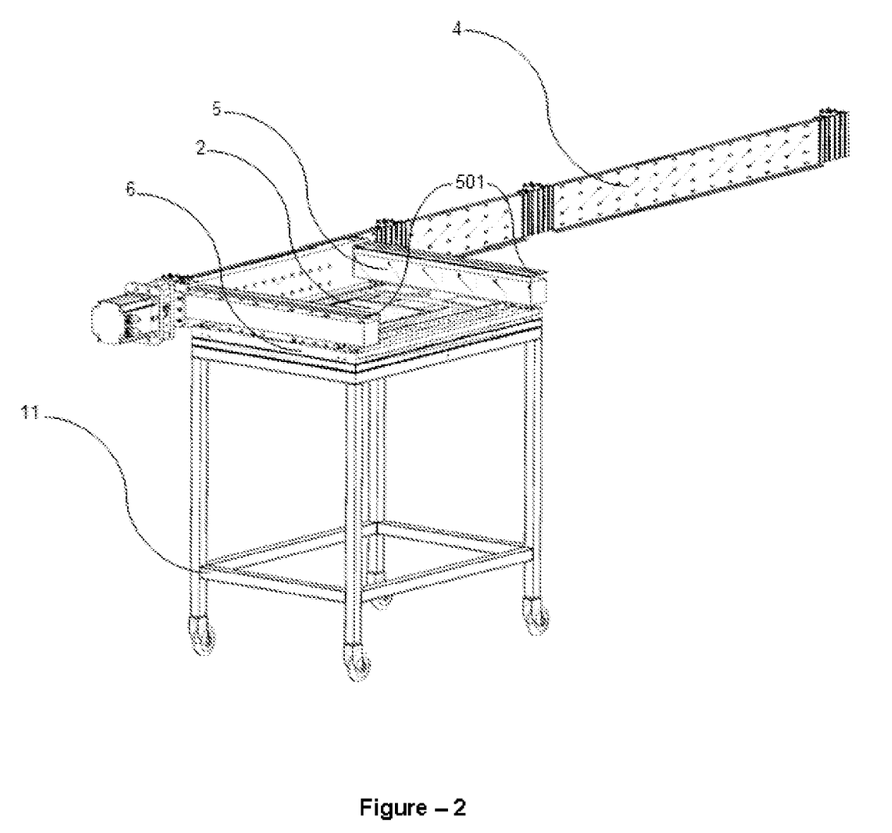
FIG. 2 is a perspective view of the rail system, holding apparatus, frame, plate and carrying vehicle.

All the parts illustrated in figures are individually assigned a reference numeral and the corresponding terms of these numbers are listed below:
1. Thermoforming system
2. Plate
201. Fiber
3. Mold
301, 302. Channel
303. Mold heater
4. Rail System
401. Support Element
5. Holding Apparatus
501. Electronic Component
6. Frame
7. Control Unit
8. Magnet
9. Conditioning Unit
901. Cold Tank
902. Heat Exchanger
903. Cooler
904. Hot Tank
905. Heater
906. Circulation Pump
907. Warm Tank
908. Reheater
10. Consolidation Mold
1001, 1002. Consolidation Mold Channel
1003. Consolidation Mold Heater
11. Carrying vehicle
12. Thermal Door
(Y) Loading Area
(I) Heating Area
(B) Pressing Area
(S) Thermoforming Area The thermoforming system (1) comprises a composite plate (2); a loading area (Y) in which the plate (2) is placed; a heating area (1) in which the plate (2) is heated; a pressing area (B) in which the plate (2) is formed; at least one mold (3) which is located in the pressing area (B) and applies heat and pressure to the plate (2) so that the plate (2) is formed; a thermoforming area (S) which is formed by the loading area (Y), heating area (I) and the pressing area (B) and consists of at least two different surfaces located opposite to each other; a rail system (4) located on at least one surface in the thermoforming area (S) and allowing the plate (2) to be conveyed within the thermoforming area (S) (FIG. 1). The thermoforming system (1) of the invention comprises a holding apparatus (5) provided on the rail system (4) such that it can move by sliding along the rail system (4); at least one frame (6) which is mounted removably on the holding apparatus (5) and on which the plate (2) is placed, thus allowing the plate (2) to be positioned along the thermoforming area (S) by means of the rail system (4) and the holding apparatus (5); a control unit (7) which allows the frame (6) to be detached from the holding apparatus (5) and/or the frame (6) to be attached to the holding apparatus (5) (FIG. 1, FIG. 2).

The plate (2), which is a thermoplastic material, is loaded by the user into the loading area (Y) that is the first area where thermoforming processes are carried out. The plate (2) is heated in the heating area (I) above its melting temperature and is prepared for the forming process. The plate (2) conveyed into the pressing area (B) is kept above the glass transition phase in the mold (3) and is formed under the pressure applied by the mold (3) the value of which is determined by a user. In the thermoforming system (1), a thermoforming area (S) is defined, which is formed by the loading area (Y), the heating area (I) and the pressing area (B). In the thermoforming area (S), there is provided a rail system (4) connected to at least one surface and allowing the plate (2) to be conveyed between the areas. The rail system (4) can move up and down, left and right (FIG. 1, FIG. 2).

On the rail system (4), there is provided a holding apparatus (5) which is removably mounted. The holding apparatus (5) can slide on the rail system (4). Thanks to a frame (6) that is removably attached to the holding apparatus (5) and a control unit (7) that can control the position of the frame (6) relative to the holding apparatus (5), the plate (2) placed on the frame (6) is conveyed by means of the holding apparatus (5) sliding on the rail system (4) in the thermoforming area (S) and by the frame (6) connected to the holding apparatus (5). Thus, the frame (6) to be used in different sizes and designs according to the changing mold (3) and plate (2) structure for the thermoforming process is practically attached to the holding apparatus (5). At the same time, by controlling the separation and integration between the frame (6) and the holding apparatus (5) by means of the control unit (7), it is enabled that the plate (2) material effectively surrounds the surface of the mold (3). In this way, the tension forces and errors that may arise with the effect of holding apparatus (5) are reduced (FIG. 1, FIG. 2).

Figure 3:
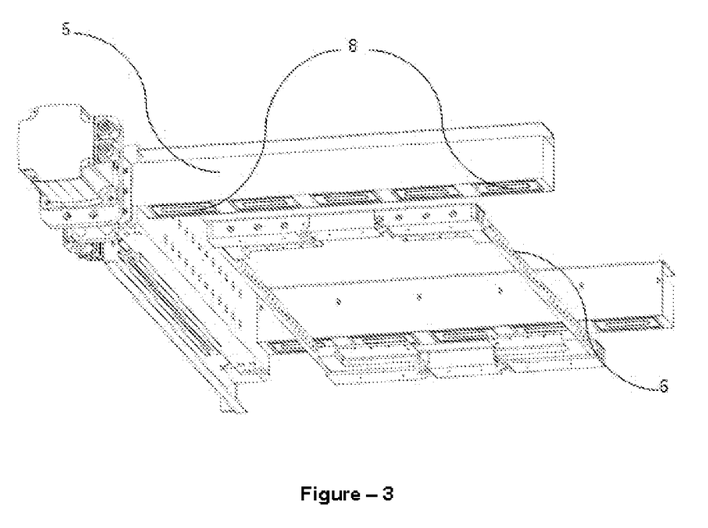
FIG. 3 is a bottom perspective view of the holding apparatus and frame.

In an embodiment of the invention, the thermoforming system (1) comprises at least one magnet (8) which is located on the holding apparatus (5) and/or the frame (6) and enables the frame (6) to be held by the holding apparatus (5) by means of the control unit (7). Thanks to the frame (6) held and/or released practically by the magnet (8), an effective and safe solution is provided for high-capacity mass production of thermoplastic composites (FIG. 3).

In an embodiment of the invention, the thermoforming system (1) comprises at least one electronic component (501) which is located on the holding apparatus (5) and moves together with the holding apparatus (5), wherein the electronic component (501) provides the electrical conductivity between the control unit (7) and the magnet (8), thus allowing the magnetic force on the magnet (8) to be adjusted by the control unit (7) and the frame (6) to be held and/or released by the holding apparatus (5). Therefore, the force of the magnet (8) can be adjusted practically by the control unit (7), and the frame (6) and plate (2) can be moved, released and removed effectively (FIG. 1).

In an embodiment of the invention, the thermoforming system (1) comprises a frame (6) which can be folded and bent by means of the magnet (8). Based on the commands given by the control unit (7) to the magnet (8), during the thermoforming process applied to the plate (2) by means of the mold (3) thanks to the folded frame (6), permanent defects crucial for the composite plate (2) that may result from the mismatch between the frame (6) and the mold (3) geometry, such as material rupture, wrinkling, etc., are reduced (FIG. 1, FIG. 2).

Figure 4:
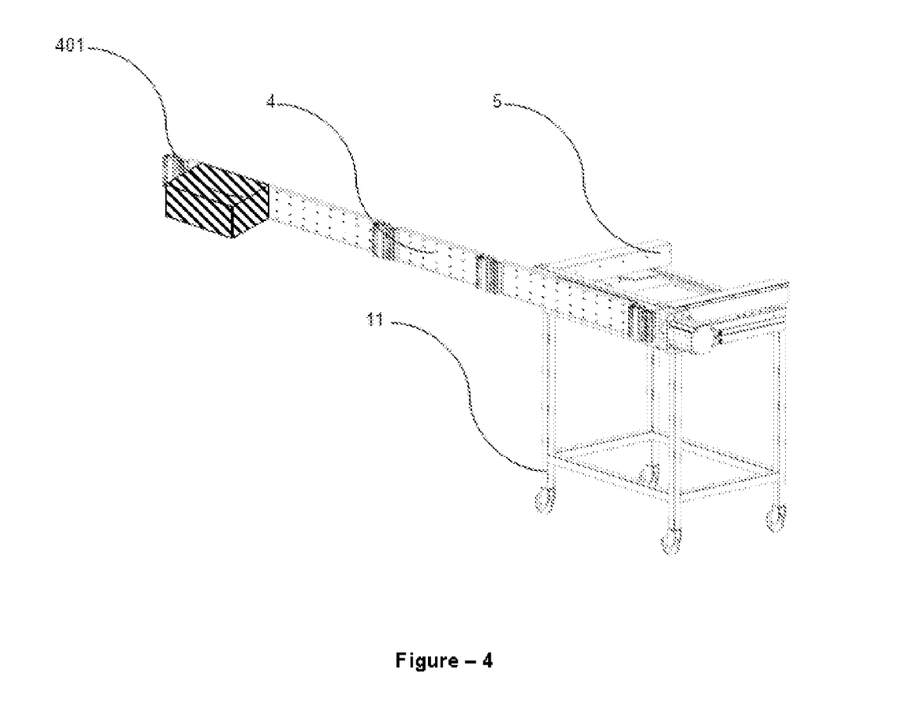
FIG. 4 is a perspective view of the support element, rail system, carrying vehicle and frame.

In an embodiment of the invention, the thermoforming system (1) comprises at least one support element (401) which is located on the rail system (4), allows the center of gravity on the rail system (4) to be maintained against weight destabilization occurring during the positioning of the holding apparatus (5) on the rail system (4), and allows the rail system (4) to be balanced; a control unit (7) which is in communication with the support element (401) and allows the balance on the rail system (4) to be maintained by sliding the support element (401) on the rail system (4). As a result of the movement of the holding apparatus (5) on the rail system (4), location of the center of gravity changes on the rail system (4). Therefore, destabilization that may occur on the rail system (4) may cause problems such as material rupture, wrinkling, and inhomogeneous heat distribution on the plate (2) on which the thermoforming process will be performed. The rail system (4) is kept in balance by the support element (401) activated by the control unit (7) in order to balance the rail system (4) according to the position change of the holding apparatus (5) on the rail system (4). Thus, a reliable thermoforming system (1) is obtained (FIG. 4).

Figure 5:
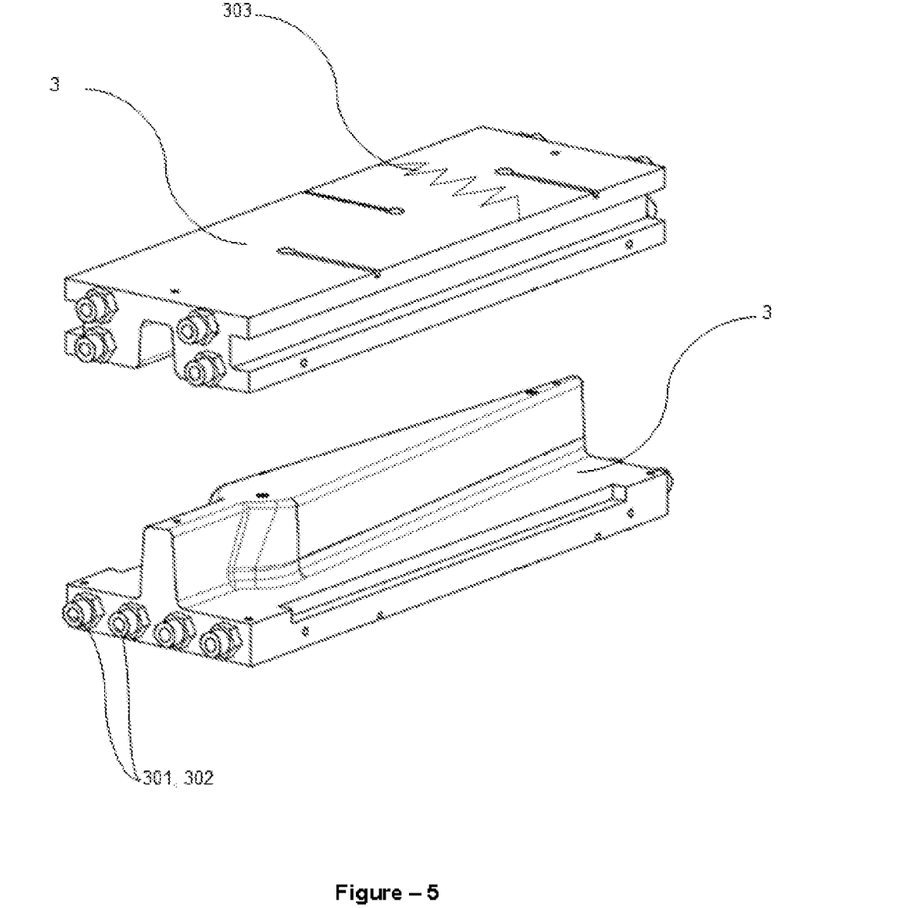
FIG. 5 is a perspective view of the mold, channels and mold heater.
Figure 6:
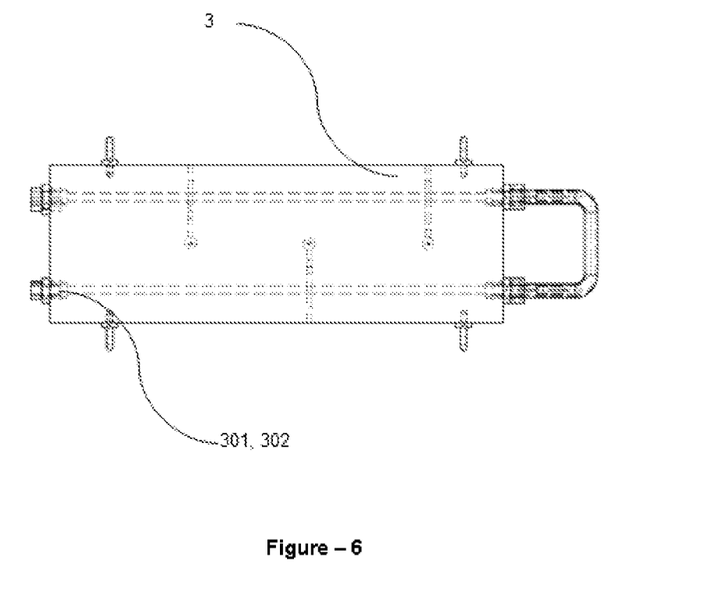
FIG. 6 is a partial section view of the mold and channels.

In an embodiment of the invention, the thermoforming system (1) comprises at least two channels (301, 302) which are located in the mold (3) independently of each other and allow the fluid used in heating and/or cooling processes to flow therethrough without mixing with each other. By using fluid, the molds (3) directly perform fast, controlled and homogeneous heating and cooling processes without using an extra heating element. There are channels (301, 302) in the mold (3) that allow individual heating and cooling processes. Fluids used for heating and cooling processes do not mix with each other. Therefore, the heating and cooling cycles can be controlled individually. A thermoforming system (1) suitable for mass production is obtained without waiting time losses in the process of obtaining a final formed product from the plate (2) by applying controlled heating and cooling cycles in succession (FIG. 5, FIG. 6).

In an embodiment of the invention, the thermoforming system (1) comprises at least one mold heater (303) which is located on the mold (3) and allows the mold (3) to be heated and/or cooled. The mold heater (303) placed on the mold (3) can be used for additional heating (FIG. 5, FIG. 6).

Figure 7:
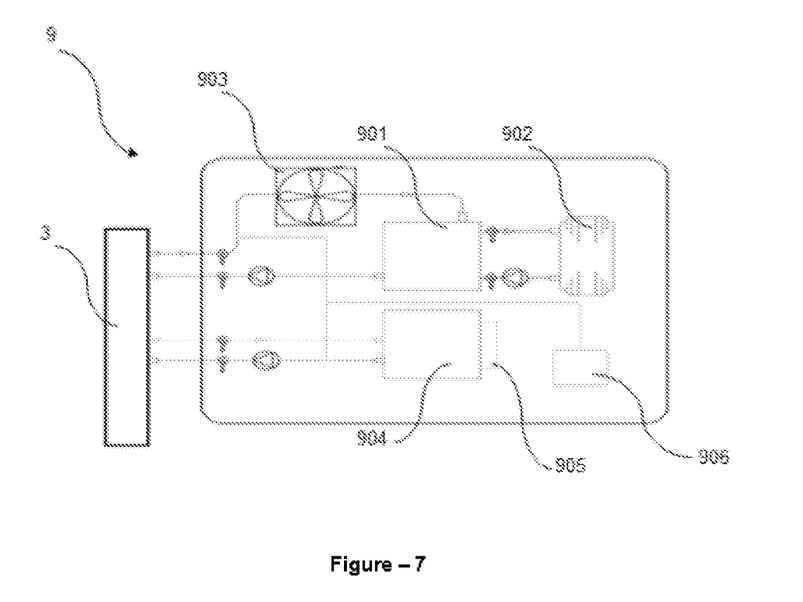
FIG. 7 is a schematic view of the conditioning unit and the mold.

In an embodiment of the invention, the thermoforming system (1) comprises at least one cold tank (901) containing fluid therein; at least one heat exchanger (902) that allows the fluid contained in the cold tank (901) to be cooled; at least one cooler (903) located in connection with the cold tank (901) and allowing the fluid contained in the cold tank (901) to be cooled; at least one hot tank (904) containing fluid therein; at least one heater (905) which allows the fluid contained in the hot tank (904) to be heated; at least one circulation pump (906) which allows circulation of the fluids contained in the hot tank (904) and the cold tank (901) through the channels (301, 302) that are located in the mold (3); a conditioning unit (9) which allows the mold (3) to be heated and/or cooled during the thermoforming process, wherein the conditioning unit (9) is formed by the hot tank (904), cold tank (901), circulation pump (906), heat exchanger (902), cooler (903) and heater (905). The conditioning unit (9) has a hot tank (904) and a cold tank (901). The fluids in the hot tank (904) and the cold tank (901) do not mix with each other. Therefore, the heating and cooling cycles can be controlled individually. The cooling process of the fluid in the cold tank (901) is realized by both the air-assisted cooler (903) and the coolant-assisted heat exchanger (902). By cooling the fluid in an effective manner, it becomes easier to obtain controlled temperature distributions on the mold (3). On the other hand, instead of directly applying a heating and/or cooling apparatus on the mold (3), the mold (3) is cooled in a controlled manner as a result of conditioning the fluid with temperature by a separate cold tank (901) that does not contact with the mold (3). In a preferred embodiment of the invention, along with the controlled cooling process, the mold (3) reaches the low temperature range required for crystal structure formation in minutes from the high temperature range required for forming after the heating process. By distributing a heated fluid directly to the channels (301, 302) inside the mold (3), instead of a heating system with a heater (905) on the mold (3), 1° C. tolerance values can be achieved as the mold (3) temperature. The fluid does not experience any significant heat loss until it is transferred from the hot tank (904) to the mold (3), wherein the temperature drops around a maximum of 5° C. are observed. Along with the controlled heating process, the mold (3) can reach the high temperature required for the forming process in minutes from the low temperature it reaches after the cooling process. Thanks to the conditioning unit (9), fast, controlled and homogeneous heating and cooling processes are carried out in the mold (3) by using fluid. The fluids contained in the hot tank (904) and the cold tank (901) located in the conditioning unit (9) circulate through the channels (301, 302) in the mold (3) by means of a circulation pump (906) connected to the circuit (FIG. 7).

In an embodiment of the invention, the thermoforming system (1) comprises at least one resin-impregnated composite fiber (201); at least one consolidation mold (10) which allows the fiber (201) to be pressed, consolidated and joined under the temperature and pressure determined by the user; at least two independent consolidation mold channels (1001, 1002) located in the consolidation mold (10), allowing heating and/or cooling processes to be performed independently of each other, wherein flow of fluids through the consolidation mold channels (1001, 1002) are independent from each other. By using a fluid, fast, controlled and homogeneous heating and cooling processes are performed directly on the consolidation mold (10) without using a heating element. Consolidation mold channels (1001, 1002) are provided in the consolidation mold (10), which allow individual heating and cooling processes. Therefore, fluids used for heating and cooling processes do not mix with each other. In the consolidation mold (10) on which the fibers (201) are laid, heating and cooling cycles are carried out by means of the consolidation mold channels (1001, 1002). With the consolidation process, the fiber (201) is consolidated and reinforced, and a ready-made plate (2) is obtained for the thermoforming process (FIG. 8).

Figure 8:
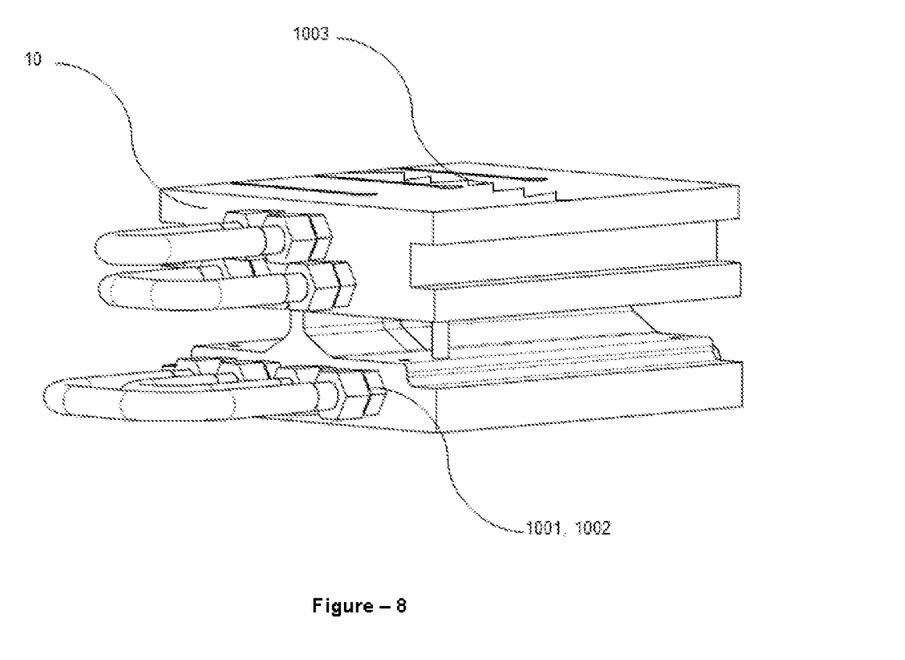
FIG. 8 is a schematic view of the consolidation mold, consolidation mold channels and the consolidation mold heater.

In an embodiment of the invention, the thermoforming system (1) comprises a conditioning unit (9) which heats and circulates the fluid used in consolidation mold channels (1001, 1002) (FIG. 8).

Figure 9:
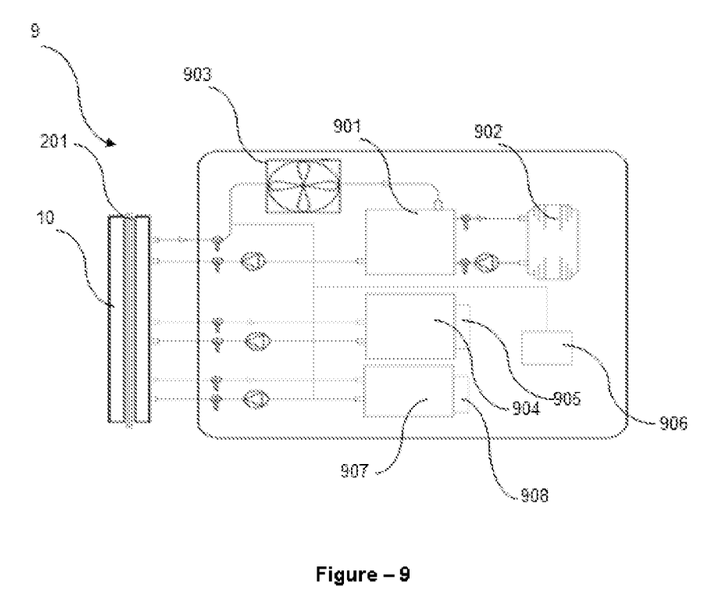
FIG. 9 is a schematic view of the conditioning unit and consolidation mold.

In an embodiment of the invention, the thermoforming system (1) comprises a warm tank (907) containing a fluid therein and located in the conditioning unit (9), wherein the warm tank (907) transfers fluid to the consolidation mold channels (1001, 1002) located in the consolidation mold (10) by means of a circulation pump (906), thus allowing the mold (3) to be heated and/or cooled; a reheater (908) located in the conditioning unit (9) and allowing the warm tank (907) to be heated. By using fluid, fast, controlled and homogeneous heating and cooling processes are performed in the consolidation mold (10). A hot tank (904), a warm tank (907) and a cold tank (901) are provided in the conditioning unit (9). Fluids used for heating and cooling processes do not mix with each other. Therefore, the heating and cooling cycles can be controlled individually. It is performed by the heater (905) located in the hot tank (904) and allowing the hot tank (904) to be heated, and the heater (908) located in the warm tank (907) and allowing the warm tank (907) to be heated. The heated fluids are sent directly to the consolidation mold (10). In a preferred embodiment of the invention, using the warm tank (907) provides the possibility of gradual heating. The cooling process of the fluid in the cold tank (901) is realized by both the air-assisted cooler (903) and the coolant-assisted heat exchanger (902). Cooling the fluid with air and a coolant facilitates to obtain controlled temperature distributions on the consolidation mold (10). By distributing the heated fluid directly into the consolidation mold (10) instead of the using a heating system with an apparatus located on the consolidation mold (10), ±2° C. tolerance values are obtained as the temperature of the consolidation mold (10). The fluid does not experience any significant heat loss until it is transferred from the hot tank (904) to the consolidation mold (10), wherein temperature drops around a maximum of −5 to −10° C. are observed. Along with the controlled heating process, the consolidation mold (10) can reach the high temperature required for the forming process in minutes from the low temperature it reaches after the cooling process. As a result of temperature conditioning in the cold tank (901), the cooling process is performed for the consolidation mold (10) in a controlled manner. The fluid used for the cooling process is sent directly into the consolidation mold (10). The fluid heated at the end of the cooling process of the consolidation mold (10) is cooled by both the air-assisted cooler (903) and the coolant-assisted heat exchanger (902). Along with the controlled cooling process, the mold (3) reaches the low temperature range required for crystal structure formation in minutes from the high temperature range required for the forming process after the heating process. A thermoforming system (1) suitable for mass production is obtained without waiting time losses in the process of obtaining the plate (2) from the fiber (201), with the consolidation process, by applying controlled heating and cooling cycles in succession.

In an embodiment of the invention, the thermoforming system (1) comprises a consolidation mold heater (1003) which is located on the consolidation mold (10) and allows the consolidation mold (10) to be heated and/or cooled. The consolidation mold heater (1003) placed on the consolidation mold (10) can additionally be used for temperature control (FIG. 8, FIG. 9).

In an embodiment of the invention, the thermoforming system (1) comprises a movable carrying vehicle (11) which allows the plate (2) and the frame (6) to be conveyed to the loading area (Y), wherein the movable carrying vehicle (11) is removably attached to the loading area (Y), wherein the frame (6) can be mounted removably on the carrying vehicle (11). The plate (2) and the frame (6) can be carried manually by the operator. Considering both the frame (6) and the plate (2) weight, it may cause physical injuries for the user and/or operator. By taking into account the time spent for placing the plate (2) to the loading area (Y) by the user or the operator, it occupies the thermoforming area (S), increasing the predicted production times and decreasing the accessible production capacities. The carrying vehicle (11) reduces the labor and operation times. A precise positioning can be achieved by means of the carrying vehicle (11). It is not possible to carry the large parts to be produced manually by the operator due to both size and weight. The carrying vehicle (11) also provides operational convenience for large parts (FIG. 2). In an embodiment of the invention, the thermoforming system (1) comprises a removable thermal door (12) located in the thermoforming area (S), which at least partially absorbs the heat transfer between the loading area (Y) and the heating area (I). While the plate (2) is heated in the heating area (I), a thermal door (12) is used, which allows heat loss outside the heating area (I) to be at least partially prevented. Thus, an efficient thermoforming system (1) is obtained (FIG. 1).

The thermoforming system (1) comprises a composite plate (2); a loading area (Y) in which the plate (2) is placed; a heating area (I) in which the plate (2) is heated; a pressing area (B) in which the plate (2) is formed; at least one mold (3) located in the pressing area (B), which applies heat and pressure to the plate (2), thus allowing the plate (2) to be shaped; a thermoforming area (S) formed by the loading area (Y), the heating area (I) and the pressing area (B) and consisting of at least two different surfaces located opposite to each other; a rail system (4) located on at least one surface in the thermoforming area (S) and allowing the plate (2) to be conveyed within the thermoforming area (S).

The thermoforming system (1) of the invention comprises a control unit (7) for:
- receiving and conveying the frame (6) and plate (2) in the loading area (Y) by the holding apparatus (5) by means of the magnet (8);
- moving the holding apparatus (5) to convey the plate (2) and the frame (6) to the heating area (I);
- during movement of the holding apparatus (5), balancing the rail system (4) by the sliding movement of the support element (401);
- heating the plate (2) in the heating area (I);
- conveying the plate (2) and the frame (6) into the pressing area (B) by means of the holding apparatus (5);
- during movement of the holding apparatus (5), balancing the rail system (4) by the sliding movement of the support element (401);
- having a change in the shape of the frame (6) by means of the magnet (8);
- applying thermoforming process on the plate (2) by means of the mold (3).

The thermoplastic plate (2) is loaded by the user into the loading area (Y), wherein the loading area (Y) is the first area where thermoforming processes are carried out. The plate (2) is heated in the heating area (1) above its melting temperature and is prepared for the forming process. The plate (2) conveyed into the pressing area (B) is kept above the glass transition phase in the mold (3) and is formed under the pressure applied by the mold (3), the value of which is determined by a user. In the thermoforming system (1), a thermoforming area (S) is defined, which is formed by the loading area (Y), the heating area (I) and the pressing area (B). In the thermoforming area (S), there is provided a rail system (4) connected to at least one surface and allowing the plate (2) to be conveyed between the areas.

- The thermoforming system (1) has a loading area (Y) for placing the plate (2) to be be subjected to the thermoforming process into the thermoforming area (S), which is the process line, and the frame (6) and the plate (2) placed thereon are taken by the holding apparatus (5) from the loading area (Y).
- After the plate (2) is taken by the holding apparatus (5) through the frame (6) in the loading area (Y), the holding apparatus (5) slides on the rail system (4) such that it conveys the plate (2) and the frame (6) to the heating area (I). At the same time, the imbalance that may arise from the sliding movement of the holding apparatus (5) on the rail system (4) is compensated by the movement of the support element (401).
- In the heating area (I), the plate (2) is heated above the melting temperature, thus, in the pressing area (B), the plate (2) effectively surrounds the surface of the mold (3) and an effective forming process is enabled.

The holding apparatus (5) slides on the rail system (4) such that it conveys the frame (6) and the heated plate (2) to the pressing area (B). At the same time, the imbalance that may arise from the sliding movement of the holding apparatus (5) on the rail system (4) is compensated by the movement of the support element (401).

The frame (6) conveyed into the pressing area (B) is bent according to a command given by the control unit (7) to the magnet (8) such that the frame (6) has a form fitting into the geometry of the mold (3). Therefore, the plate (2) is placed into the mold (3) effectively and securely so that an effective thermoforming process is realized by the command given by the control unit (7) to the mold (FIG. 1).

The invention claimed is:

1. A thermoforming system (1) comprising:
a composite plate (2);
a loading area (Y) in which the plate (2) is placed;
a heating area (I) in which the plate (2) is heated;
a pressing area (B) in which the plate (2) is formed;
a mold (3) which is located in the pressing area (B) and applies heat and pressure to the plate (2) so that the plate (2) is formed;
a thermoforming area(S) which is formed by the loading area (Y), heating area (I) and the pressing area (B) and consists of at least two different surfaces located opposite to each other;
a rail system (4) located on at least one surface in the thermoforming area(S) and allowing the plate (2) to be conveyed within the thermoforming area(S);
a holding apparatus (5) provided on the rail system (4) such that it can slide along the rail system (4);
a frame (6) which is mounted removably on the holding apparatus (5) and on which the plate (2) is placed, thus allowing the plate (2) to be positioned along the thermoforming area(S) by means of the rail system (4) and the holding apparatus (5);
a control unit (7) which allows the frame (6) to be detached from the holding apparatus (5) and/or the frame (6) to be attached to the holding apparatus (5);
at least one magnet (8) which is located on the holding apparatus (5) and/or the frame (6) and enables the frame (6) to be held by the holding apparatus (5) by means of the control unit (7); and
at least one electronic component (501) which is located on the holding apparatus (5) and moves together with the holding apparatus (5), wherein the electronic component (501) provides electrical conductivity between the control unit (7) and the magnet (8), thus allowing a magnetic force on the magnet (8) to be adjusted by the control unit (7) and the frame (6) to be held and/or released by the holding apparatus (5).

2. The thermoforming system (1) according to claim 1, wherein the frame (6) can be folded and bent by means of the magnet (8) based on commands given by the control unit (7) to the magnet (8).

3. The thermoforming system (1) according to claim 1, comprising at least one support element (401) which is located on the rail system (4) and which allows a center of gravity on the rail system (4) to be maintained against weight destabilization occurring during the positioning of the holding apparatus (5) on the rail system (4), and allows the rail system (4) to be balanced.

4. The thermoforming system (1) according to claim 1, comprising at least two channels (301, 302) which are located in the mold (3) independently of each other and allow a fluid used in heating and/or cooling processes to flow therethrough without mixing with each other.

5. The thermoforming system (1) according to claim 1, comprising at least one mold heater (303) which is located on the mold (3) and allows the mold (3) to be heated.

6. The thermoforming system (1) according to claim 4, comprising:
at least one cold tank (901) containing fluid therein;
at least one heat exchanger (902) that allows the fluid contained in the cold tank (901) to be cooled;
at least one cooler (903) located in connection with the cold tank (901) and allowing the fluid contained in the cold tank (901) to be cooled;
at least one hot tank (904) containing fluid therein;
at least one heater (905) which allows the fluid contained in the hot tank (904) to be heated;
at least one circulation pump (906) which allows circulation of the fluids contained in the hot tank (904) and the cold tank (901) through the channels (301, 302) that are located in the mold (3); and
a conditioning unit (9) which allows the mold (3) to be heated and/or cooled during the thermoforming process, wherein the conditioning unit (9) is formed by the hot tank (904), cold tank (901), circulation pump (906), heat exchanger (902), cooler (903) and heater (905).

7. The thermoforming system (1) according to claim 1, comprising
at least one resin-impregnated composite fiber (201);
at least one consolidation mold (10) which allows the fiber (201) to be pressed, consolidated and joined under a temperature and a pressure determined by a user;
at least two independent consolidation mold channels (1001, 1002) located on the consolidation mold (10), allowing heating and/or cooling processes to be performed independently of each other, wherein a flow of fluids through the consolidation mold channels (1001, 1002) are independent from each other.

8. The thermoforming system (1) according to claim 7, comprising a conditioning unit (9) which heats and circulates the fluids used in consolidation mold channels (1001, 1002).

9. The thermoforming system (1) according to claim 7, comprising:
a warm tank (907) containing fluid therein and located on a conditioning unit (9), wherein the warm tank (907) transfers fluid to the consolidation mold channels (1001, 1002) located on the consolidation mold (10) by means of a circulation pump (906), thus allowing the mold (3) to be heated; and
a reheater (908) located on the conditioning unit (9) and allowing the warm tank (907) to be heated.

10. The thermoforming system (1) according to claim 7, comprising a consolidation mold heater (1003) which is located on the consolidation mold (10) and allows the consolidation mold (10) to be heated.

11. The thermoforming system (1) according to claim 1, comprising a movable carrying vehicle (11) which allows the plate (2) and the frame (6) to be conveyed to the loading area (Y), wherein the movable carrying vehicle (11) is removably attached to the loading area (Y), wherein the frame (6) can be mounted removably on the carrying vehicle (11).

12. A thermoforming system (1), comprising:
a composite plate (2);
a loading area (Y) in which the plate (2) is placed;
a heating area (I) in which the plate (2) is heated:
a pressing area (B) in which the plate (2) is formed:

at least one mold (3) located in the pressing area (B), which applies heat and pressure to the plate (2), thus allowing the plate (2) to be shaped:

a thermoforming area(S) formed by the loading area (Y), the heating area (I) and the pressing area (B) and consisting of at least two different surfaces located opposite to each other:

a rail system (4) located on at least one surface in the thermoforming area(S) and allowing the plate (2) to be conveyed within the thermoforming area(S); and a control unit (7) for controlling:
- receiving and conveying a frame (6) and plate (2) in the loading area (Y) by the holding apparatus (5) by means of a magnet (8) based on commands given by the control unit (7) to the magnet (8);
- moving a holding apparatus (5) to convey the plate (2) and the frame (6) to the heating area (I);
- during movement of the holding apparatus (5), balancing the rail system (4) by the sliding movement of the support element (401);
- heating the plate (2) in the heating area (I);
- conveying the plate (2) and the frame (6) into the pressing area (B) by means of the holding apparatus (5);
- during movement of the holding apparatus (5), balancing the rail system (4) by the sliding movement of a support element (401);
- having a change in a shape of the frame (6) by means of the magnet (8) based on commands given by the control unit (7) to the magnet (8); and
- applying thermoforming process on the plate (2) by means of the mold (3).

* * * * *